9186X
B. P. Coston,
Brick Machine.
Patented Oct. 22, 1835.
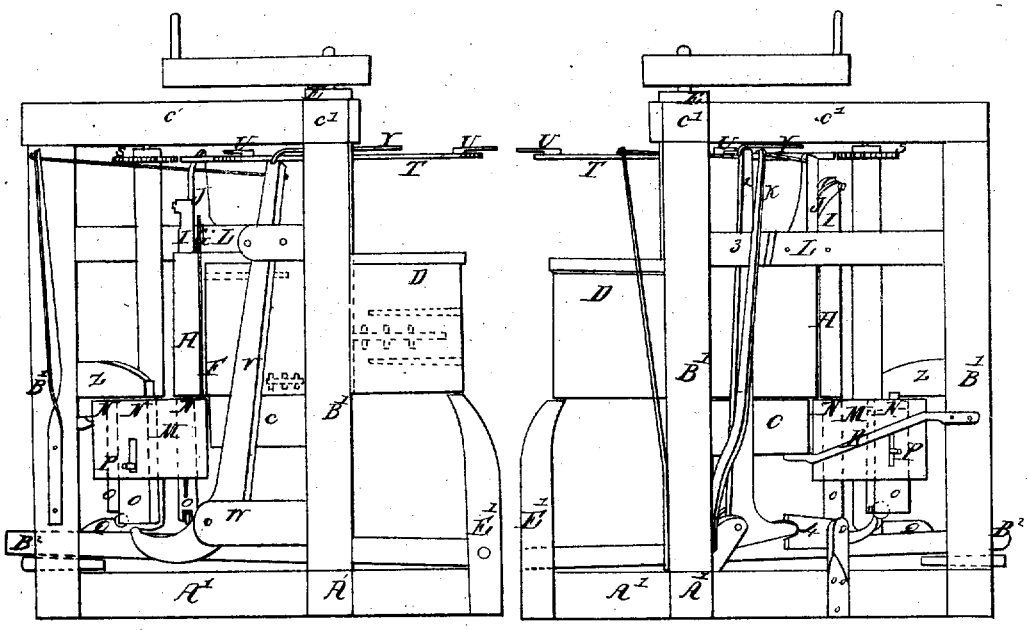
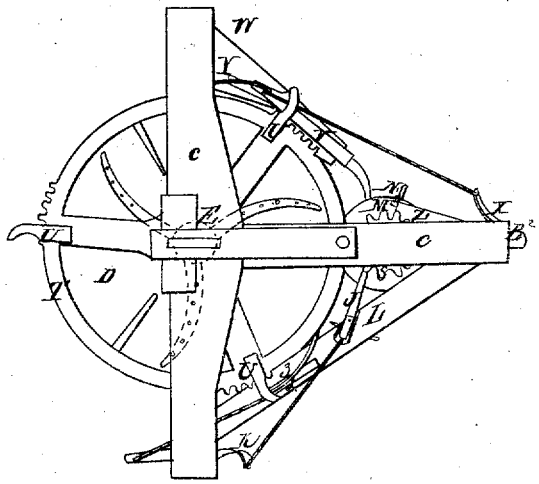
AM. PHOTO-LITHO. CO. N.Y. (OSBORNE'S PROCESS)

Benton P. Coston of Sterling. County of Wayne. Penn.

The Schedule referred to in these Letters Patent, and making part of the same, containing a description in the words of the said Benton P. Coston himself of his improvement in the machine for making Bricks & Tile.

To All to whom these Presents shall come. Be it known that I Benton P. Coston of Sterling in the County of Wayne and State of Pennsylvania have invented a new and useful improvement in the art of making bricks & tiles by means of a machine which makes them in a finished state from the clay ready for the Kiln. & which I call the horizontal rotary brick machine. The following is a full and exact description of the construction and operation of the said machine as invented or improved by me. The Frame work A. will consist of two sills which are to be laid across each other after the fashion of a cross and from three ends of which an upright at each is to rise to the top of the frame where they join to other three ends of arms forming the top of the frame of the same form as that below. The short arm of the cross is dispensed with at the top, but below it, is used with a short upright at its end, and below it and the opposite full length one, is placed another ... sill B. on the top of the one already mentioned. it is to be moveable and to work on a pivot joint in the short upright and by means of a tenon and mortice through the other, it may with the application of a wedge or other contrivance there be raised at pleasure at that end. across this is placed the support C. intended to receive the grinding and mixing cylinder D. through the centre of which revolves the shaft E. furnished with curved or obliqued straight arms having pins through them, passing between others attached to the sides of the cylinder D. An opening E is made in the cylinder closed at pleasure by the sliding door G. while above this & and on the outside of the cylinder rises the box or case H. occupied by a piston I, which is raised and depressed by means of the elbow-
lever J. having at one end where it joins the piston I. a pivot joint
and slat, to raise the piston perpendicularly, while at the other end
it is connected with the spring K to draw it again after being
depressed. The elbow or angular point of this lever works by a
pivot in the brace L.- at the bottom of the case H, is placed a
wheel M: to revolve close beneath it upon a shaft resting on the
moveable sill B. and is intended to receive or contain the moulds
N. which pass under the opening at the bottom of the case and
cylinder as they revolve. To each of these is adapted a piston O.
having at the bottom a friction wheel and above the centre of the
length a pin P. projecting through a slot in the side of the wheel
of sufficient length to admit of its play up and down, the intention
of these being to rise with the pistons as they are filled and pressed
and passed on to the platform Q. round which they traverse on
the friction wheels until the said pins come in contact with the
bar or inclined plane R, by following the course of which the pins
being guided thereby and having friction wheels revolving on them
cause the pistons to descend to the requisite depth for filling again
under the box H, At the top of the shaft is secured a cog wheel S,
to geer into another larger one T on the shaft E, which is furnished
with cogs on as many segments only as there are moulds and
those distributed equally around the circumference or at regular
intervals proportioned to the spaces between the moulds, at the
commencement of each segment of cogs there is a projecting arm
U, or cam, which as the wheel T revolves strikes against the
elbow-lever F and forces its piston down, then against the
top of the lever V. which descends to the bottom of the frame &
works by an elbow upon a pivot in the brace W. the end turning
up under the bottom of the piston where it is furnished with
a friction roller the more easily to pass over the bottom of the
piston. The top of it is connected with the spring R, which
draws it back again to its required position. At the top of the lever V. is an iron rod or bar, Y. placed horizontally, forming a continuation of its length in the direction of the revolution of the wheel T. or opposite to the curved or turned up part at the bottom, which is intended to retain the lever, and consequently the piston above it in its position after the work allotted to it is completed, and until the next segment takes hold. The intention of this lever V is to press the brick (by applying the power to the piston below it) upwards against the fixed block Z secured to one of the uprights of the frame, and to land the said Piston on the top of the platform 2. The wheel T continuing is revolution after the arm at the segment has passed over V. the last described lever brings that arm which precedes it in contact with another lever marked 2 striking against its top which has also a rod Y. in continuation similar to that on V. the lever descends through a slot or opening in the brace 3. between the uprights (which serves as a guide) to the cross sill at the bottom, or rather near it where it assumes an elbow or angular shape, terminating in a flattened edge, this edge works in a fork 4. which as well as the angular point of the lever, works on a pivot in a brace connected with the frame, and continues to the inner side of the circular platform 2. when it rises under the piston which has passed under the pressing block Z with the completed brick and raises it up to the level of the face of the wheel ready to be taken off, as complete. I would mention that I also apply the scraper [.....] remove any soft clay which might adhere or project above the mould and fasten it to the fixed block. This lever is also connected with a spring similar to the others. Upon the top of the shaft is applied the power of whatever description by which the machine is to be driven t...ation. In order to grind or mix the clay ready for use, lower the movable sill B. by means of the wedges which will throw the machine out of ge.r, then close the sliding door 6 and the cylinder being filled with clay commence turning the shaft thereof until it is sufficiently mixed, this being done raise

9186X the sill B. and [. . . . .] round the wheel M until one of the moulds will be brought under the box H, Now raise the sliding door G. and start the machine [. . . .] revolutions ~~of~~ the arms in the cylinder D forces the clay on, owing to their curved shape or stay [. . . . . .] obliquely into the box H by the opening E and one of the am W . . . [illegible] against the top of the lever J. . . . . . . . drives the Piston I . . . . . . . fills the mould . . . . . . . . . . . . . . . . . . . . . . . . . . . . . . . . . . . . . . . . . . . . arm gears into the wheel S. which causes the shaft and wheel M to revolve towards the pressing block, until it stops under it (from the termination of the cogs in the segment) The arm W has by this time arrived at the top of the lever. V. against which it strikes and urges on which produces at the other or curved end, the upright motion under the piston for the purpose of pressing the brick against the pressing block Z and it is retained in this position by mea of the rod or bar (Y, until the following segment takes hold on the wheel S when it moves on again, and by the assistance of the lever V. lands the piston O. on the circular platform Q. and moves on the brick pressed under the block and scraper 5. whi finishes it. By means of the termination of the cogs in the segme the wheel M remains stationary here until one of the arms. W. passing over the top of the lever Q. drives it on in the course of its revolution & so as to lower the end working in the fork 4. whic working on its pivot, raises the other extending under the pis-ton which supports the finished brick and raises it up level with the top of the wheel ready to be removed. One of the arms W. has now arrived with its segment again at the lever J, fast operated on. & the segment cogs by means of the wheel S. sets the wheel M. on the shaft in motion again, which carries on the empty piston and mould towards the box to be filled anew. but in doing this the pins and friction rollers P are obliged to pas under and round the fixed inclined plane or rod R which carries down the piston so as to leave the mould ready to be filled 233 9186X 85

At this point the operation is renewed and repeated by the continuance of the power. At the different points of friction where I may deem it necessary, I propose adding friction rollers for reasons which must be apparent. I also form the bottom of the piston, I, with a convex projection for the purpose of filling the moulds in the corners.

What I claim as my invention and not heretofore known or used in my above described improvement for making bricks, and for which I ask Letters Patent is. 1st The manner of forcing the mixed clay into the revolving moulds by the combined action of the lever, piston, and spring constructed and acting on the principles above set forth. 2dly The application of a wheel containing arms or cams and segments only, of cogs upon its circumference at such intervals as to produce the revolution of the moulds at such times as may be required by the arrangement of the levers. 3d. also the pressing the brick against a fixed block by means by means of said _ and a lever operating and operated on as shown above. 4th " The manner of delivering the finished brick from the revolving Moulds by means of a lever operating and operated on as described. 5th The manner of opening the moulds by means of the pin & inclined plane or bar, constructed and acting as above. 6th The general construction and arrangement of the several parts of my machine, from which it derives its character, enabling a competent machinist to distinguish it from others invented for mixing, moulding pressing & delivering bricks. But be it understood that I lay no claim to any of these parts individually or separately as they may form elements of other machines, but only the combination and construction of them according to the plan and principles I have above set forth. . . . In testimony that the above is a full and exact description of the construction & mode of operation of my machine as invented or improved by me, I have hereunto set my hand this sixteenth day of September in the year Eighteen hundred and thirty five.

Witnesses
C. H. W. Whatton
Henry Stone
(1984 words)

(Drawing) Benton B. Coston

Exd. W.J.C.

(Patented 20d. Oct 1835.)

( Drawing